United States Patent
Ives et al.

(10) Patent No.: US 10,075,742 B2
(45) Date of Patent: *Sep. 11, 2018

(54) SYSTEM FOR SOCIAL MEDIA TAG EXTRACTION

(71) Applicant: TVEyes, Inc., Fairfield, CT (US)

(72) Inventors: David J. Ives, Southport, CT (US); James H. Hayter, Monroe, CT (US); Maxim Oei, Stratford, CT (US); David B. Seltzer, Westport, CT (US)

(73) Assignee: TVEyes Inc., Fairfield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,741

(22) Filed: Sep. 20, 2016

(65) Prior Publication Data

US 2017/0013290 A1 Jan. 12, 2017

Related U.S. Application Data

(63) Continuation of application No. 15/069,044, filed on Mar. 14, 2016, now Pat. No. 9,473,448, which is a
(Continued)

(51) Int. Cl.
*H04N 7/16* (2011.01)
*H04H 60/32* (2008.01)
(Continued)

(52) U.S. Cl.
CPC ... *H04N 21/23418* (2013.01); *G06K 9/00442* (2013.01); *G06K 9/00744* (2013.01);
(Continued)

(58) Field of Classification Search
CPC .......... H04N 21/23418; H04N 21/231; H04N 21/234336; H04N 21/4788; H04N 21/222;
(Continued)

(56) References Cited

U.S. PATENT DOCUMENTS 7,570,816 B2 * 8/2009 Bargeron ........... G06K 9/00442
382/176
8,320,674 B2 * 11/2012 Guillou ............... G06K 9/3266
382/164
(Continued)

OTHER PUBLICATIONS

Epshtein, Ofek & Wexler, Detecting Text in Natural Scenes with Stroke Width Transform, pp. 1-8; (2010).

*Primary Examiner* — Oschta Montoya
(74) *Attorney, Agent, or Firm* — Forge IP, PLLC

(57) ABSTRACT

A system for extracting and monitoring media tags within video content includes at least one server in communication with a plurality of content sources, the server receiving video content from the content sources, a recorder saving the video content, a detector receiving at least one frame of the video content, the detector detecting one or more unknown text within the frame and creating one or more images, each image associated with one of the one or more unknown text, the detector generating metadata associated with the one or more unknown text appearing in the frame, and an optical character recognition engine scanning the one or more images and converting the one or more images into one or more known text. The server further determines that the one or more known text is a media tag.

26 Claims, 10 Drawing Sheets

Related U.S. Application Data continuation of application No. 14/832,272, filed on Aug. 21, 2015, now Pat. No. 9,325,660, which is a continuation of application No. 14/297,041, filed on Jun. 5, 2014, now Pat. No. 9,148,675.

(60) Provisional application No. 61/831,442, filed on Jun. 5, 2013.

(51) Int. Cl.
| | |
|---|---|
| *H04N 21/234* | (2011.01) |
| *H04N 21/231* | (2011.01) |
| *H04N 21/2343* | (2011.01) |
| *H04N 21/4788* | (2011.01) |
| *H04L 12/58* | (2006.01) |
| *H04L 29/06* | (2006.01) |
| *H04L 29/08* | (2006.01) |
| *G06K 9/00* | (2006.01) |
| *G06K 9/46* | (2006.01) |
| *G06K 9/34* | (2006.01) |
| *H04N 21/222* | (2011.01) |
| *H04N 21/239* | (2011.01) |
| *H04N 21/84* | (2011.01) |

(52) U.S. Cl.
CPC ............... *G06K 9/344* (2013.01); *G06K 9/46* (2013.01); *H04L 51/32* (2013.01); *H04L 65/601* (2013.01); *H04L 67/1095* (2013.01); *H04N 21/222* (2013.01); *H04N 21/231* (2013.01); *H04N 21/2393* (2013.01); *H04N 21/234336* (2013.01); *H04N 21/4788* (2013.01); *H04N 21/84* (2013.01); *G06K 2009/4666* (2013.01); *G06K 2209/01* (2013.01)

(58) Field of Classification Search
CPC .... H04N 21/2393; H04N 21/84; H04L 51/32; H04L 65/601; H04L 67/1095; G06K 9/00442; G06K 9/46; G06K 9/00744; G06K 9/344; G06K 2009/4666; G06K 2009/01

See application file for complete search history.

(56) References Cited

U.S. PATENT DOCUMENTS

2005/0201619 A1\* 9/2005 Sun ...................... G06K 9/3266
382/176
2008/0091713 A1\* 4/2008 Candelore ............. H04N 7/163

\* cited by examiner

SYSTEM FOR SOCIAL MEDIA TAG EXTRACTION

FIELD OF THE INVENTION

The present teachings relate generally to broadcast monitoring and more specifically to a system and method for monitoring and extracting social media tags in video content as well as tracking social media events (e.g., commentary, tweets, wall postings, messaging, etc.) corresponding to the appearance of the social media tags in video content.

BACKGROUND OF THE INVENTION

With the advent of the Internet, social networking and blogging services have resulted in growing use of these interactive media platforms for communicating information. In particular, social media tags provide a text-driven indexing system within network communities often used for linking content to a particular meme, topic, or person. Social media tags may take various forms, for example a hashtag (e.g., #Topic) or an @-symbol (e.g., @Person).

The integration of social media in television has further changed how social interaction and communication occurs. In particular, television programs, including TV shows and advertisements, are utilizing social media tags to promote and share news and information about TV shows, brands, products, personalities (e.g., political figures, celebrities) and political campaigns. At times, social media tags are announced in the audio portion of television content or through closed captioning. Often, social media tags are embedded within the picture portion of television content.

Systems for recognizing text within images or video are known in the art. One such system is described in U.S. Pat. No. 8,320,674 to Guillou et al. However, the system of Guillou is designed for identifying and recognizing text within a single stream of video and is not configured to concurrently receive, handle, and recognize text with multiple video streams. The system also includes other disadvantages. For example, it does not track or collect metadata information pertaining to each detected text, such as the channel/station in which the text appeared, the date and time the text appeared, or the location of the text within the video frame. Such information is relevant in evaluating the coverage, reach, influence, impact and resulting sentiment that the text has on respective audiences. Further, the system does not analyze the detected text to determine whether the text is related to a social media tag, and does not perform any analysis of social media events (e.g., commentary, tweet, wall posting, messaging, etc.) generated in response to the text appearing in the video. The system also fails to address issues with efficiently handling and managing large amounts of video and conducting character recognition scans (e.g., optical character recognition) of the video, which are data-intensive and computing-intensive processes.

Therefore, it would be beneficial to provide a system and method for detecting text embedded in video and/or images and evaluating the detected text for social media tags. It is further beneficial to provide a system and method that tracks social media events created in response to the media tags appearing in video and generating analytics data concerning social media events.

SUMMARY OF THE INVENTION

The needs set forth herein as well as further and other needs and advantages are addressed by the present embodiments, which illustrate solutions and advantages described below.

It is an object of the present teachings to provide a system and method for automated monitoring, extraction and tracking of media tags that appear in video content from one or more content sources. As used herein, the term "media tag" encompasses a keyword, phrase, combination of characters, trademark, logo, identifying mark, name, brand name, product name, social media identifier, uniform resource locator address, or the like that may be used in social media communities to label, classify, bookmark, and/or share information, mark ownership, note boundaries, and/or indicate online identity. As used herein, the term "video content" describes television content, streaming media, podcasts, video blogs, YouTube® videos, or the like.

It is another object of the present teachings to provide a scalable system for monitoring, extracting and tracking media tags within video content.

It is a further object of the present teachings to provide a system for monitoring, extracting and tracking media tags within video content that provides subscribers with real-time, near real-time, or deferred-processing analytics data of social media events generated after a media tag is displayed in the video content. As used herein, the term "social media events" describes comments or commentary, tweets, status updates, wall postings, messaging, information sharing, or the like made within information sources/services (e.g., social media platforms, social networking platforms, social bookmarking websites, blogs, online forums, etc.).

It is another object of the present teachings to provide a system for monitoring, extracting and tracking media tags within video content that provides alerts to subscribers when particular media tags (of interest to the subscribers) appear in the video content.

It is also an object of the present teachings to provide a system for monitoring, extracting and tracking media tags within video content that includes an interface for subscribers to search media tags and/or keywords (e.g., words, phrases, combinations of characters, trademarks, identifying marks, names, brand names, product names, etc.) and view search results identifying media tags that are displayed in video content and relate to the keywords.

The present teachings further provide a method for monitoring, extracting and tracking media tags within video content that achieves the above objectives.

The system according to one embodiment of the present teachings includes, but is not limited to, at least one server in communication with one or more content resources, a recorder, a detector, and an optical character recognition (OCR) engine. The server receives video content from the content sources, and the recorder saves the video content into memory or storage. The detector receives at least one frame of the video content, for example from the recorder, detects one or more unknown text within the frame, and creates one or more images, wherein each image is associated with one of the one or more unknown text. As used herein, the term "unknown text" describes a word(s), phrase(s), and/or character(s) that has been located within video, but has not been recognized (for example, made computer-readable) and analyzed. The detector also generates metadata associated with the one or more unknown text appearing in the frame. The OCR engine scans the one or more images using computer vision technology and converts the one or more images into one or more known text, wherein each of the one or more known text is associated with one of the one or more unknown text. As used herein, the term "known text" describes a word(s), phrase(s) and/or character(s) that has been recognized and analyzed via scanning, such as optical scanning. The server then determines whether the one or more known text is a media tag.

In another embodiment of the present teachings, the system includes, but is not limited to, at least one server in communication with one or more content sources to receive video content, a recorder saving the video content, a detector receiving at least one frame of the video content, detecting one or more unknown text within the frame, creating one or more images, each image being associated with one of the one or more unknown text, and generating metadata associated with the one or more unknown text, as well as an OCR engine converting the one or more images into one or more known text, wherein the server determines that the one or more known text is a media tag. The server monitors one or more information sources, which may include social media platforms (e.g., Twitter®, Facebook®, Instagram®, Google+®, Linkedin®, Friendster®, Plaxo®, etc.), social networking platforms, social bookmarking platforms, blogging platforms (e.g., Blogger®, Tumblr®, Vox®, Xanga®, etc.), online forums, and/or the like, to identify any social media events (e.g., commentary, tweets, wall postings, messaging, etc.) related to and/or generated as a result of the media tag appearing in the video content. The server comprises analytics tools, either as hardware or software executing on the server, to conduct real-time, near real-time, or deferred-processing analysis and analytics measurements concerning the social media events.

With respect to the analytics of social media events, the server for example may measure various data points regarding the number and types of interactions between social media users, the demographics (e.g., age, sex, etc.), and the devices used in generating/viewing the social media events. Such information is associated with the media tag as well as the type of TV program (e.g., TV show, news program, advertisement) during which the media tag appeared. The server may also calculate the number of times a media tag appears in the video content during a period of time (e.g., frequency that the media tag appears) and/or the number of channels/stations that show the media tag during a period of time. These calculations can then be correlated to the quantity and frequency of relevant social media events. The server thus may also measure the total activity and frequency of social media interactions involving the media tag (e.g., after the media tag is displayed in video content), including peaks and valleys in interactions. Statistics pertaining to the number of social media users that author the social media events as well as the number of "audience" users that view the social media events may be collected by the server. By measuring both groups of social media users, the server can determine in real-time, near real-time, or deferred-processing the reach and influence a media tag has after appearing on television and/or other entertainment device.

Further, the server in one embodiment of the present teachings may be configured to correlate a broadcast event with a corresponding social media event (e.g., determining that an individual tweet is the result of a social media user viewing a TV program) as well as correlate a broadcast event with a corresponding media trend (e.g., determining that a surge or spike in social media interactions on an issue is the result of a TV program airing). The server can determine the level of audience engagement by measuring the amount of social media behavior occurring as the result of a media tag appearing on screen (e.g., determining if audience is paying attention to the TV program by counting the number of relevant tweets happening in a half-hour period after the media tag appeared on screen). Additionally, the server can determine the socio-economic makeup of a cohort of social media users using information on the known makeup of a television audience (e.g., if a given TV program has an audience made of women ages 18-35, then Twitter users responding to issues on that show are likely to reflect similar demographics). The server can also keep track and build lists of highly-engaged social media users (e.g., if @User has repeatedly tweeted topics mentioned after airings of a TV show, then they are likely to be highly-engaged.)

In some embodiments of the present teachings, the server may provide access for subscribers on computational devices (e.g., laptop, desktop, smartphone, tablet, etc.) to view the detected media tag, associated metadata, social media events associated with the media tag (e.g., social media events generated after the media tag is displayed in video content), and analytics data of the social media events. The server may provide an interface, for example a web interface, that enables subscribers to search for specific keywords (e.g., media tags, words, phrases, combinations of characters, trademarks, identifying marks, names, brand names, product names, etc.) and view search results comprising media tags, metadata, social media events associated with the media tags, and analytics data of the social media events. In other embodiments, the server additionally or alternatively delivers in an automated manner the above information and data to subscribers on their computational devices in the form of a report or a dashboard/ticker display.

In addition to providing and showing the media tags, metadata, social media events, and analytics data, the server may be configured to display relevant social media events alongside a video clip of video content displaying the media tag. Such capability is useful in showing the effect the media tag has on social media interactions.

In some embodiments, the system includes a database in communication with the server for storing the media tags, metadata, social media events, analytics data, and video clip(s) of the video content which displays the media tag. In other embodiments, the server has its own storage unit for saving the above information.

In some embodiments of the present teachings, the server generates alerts which notify subscribers and/or social media users when a particular media tag appears within the video content. The alerts may comprise an audio alert, visual alert (e.g., email, text message, pop-up window), a textual alert (e.g., vibration), or a mixture thereof. Such alerts may be helpful in increasing video content engagement by providing an automatic means for notifying subscribers and/or social media users that they have been mentioned on TV. As an example, the server notifies an interested part (e.g., @InterestedParty) that they have been mentioned in an airing of their local news show.

In another embodiment of the present teachings, the system includes, but is not limited to, at least one media capture server and at least one analysis server, a communications link between the media capture server and the analysis server, a detector, and an OCR engine. The media capture server communicates with a plurality of content sources to receive video content. The media capture server includes a recorder for saving the video content. The detector receives at least one frame of the video content, detects one or more unknown text within the frame, and creates one or more images, each image associated with one of the one or more unknown text. The detector also generates metadata associated with the one or more unknown text. The OCR engine scans the one or more images using computer vision technology and converts the one or more images into known text. The analysis server has an analyzer which receives OCR content (e.g., known text) from the OCR engine and determines whether the known text is a media tag. The system also includes an interface in communication with the media capture server and/or the analysis server, wherein the interface receives a request to search for the media tag in the video content. The analysis server further generates alerts notifying when the media tag is detected in the video content.

In some embodiments, the detector is included in the media capture server while the OCR engine is included in the analysis server. In other embodiments, the detector and the OCR engine are included in the media capture server. In yet other embodiments, the detector and the OCR engine are included in the analysis server.

By utilizing multiple servers, different processing tasks involved in the system may be divided so that computing load is distributed across the servers. For example, one or more media capture servers may be configured for data-intensive computing to handle the large amounts of video content being transmitted from different content sources. Video content from broadcast TV, cable TV, satellite TV, and internet TV, although not limited thereto, are transmitted to the media capture server(s). Video content from geographically-dispersed content sources (e.g., content sources in/from different states, countries, regions, continents) may be received by the one or more media capture servers. In contrast, the analysis server may be configured for centralized processing of all video content from the one or more media capture servers to conduct OCR conversion and determine whether the known text indicates a media tag. One example of the system, therefore, may comprise a media capture server in each of the United States, England, and Canada to collect and manage the video content from the respective countries, and one analysis server receiving processed data from the three media capture servers for centralized OCR scanning and social media analysis.

The method according to one embodiment of the present teachings includes the steps of, but is not limited to, receiving video content from one or more content sources, saving the video content in a recorder, memory and/or storage, extracting at least one frame of the video content from the recorder, detecting one or more unknown text within the frame and creating one or more images, each of the one or more images associated with one of the one or more unknown text, retrieving and generating metadata associated with the one or more unknown text appearing in the frame, scanning the one or more images using optical character recognition (OCR) and converting the one or more images into one or more known text, and determining whether the one or more known text is a media tag.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

DETAILED DESCRIPTION OF THE INVENTION

Figure 1:
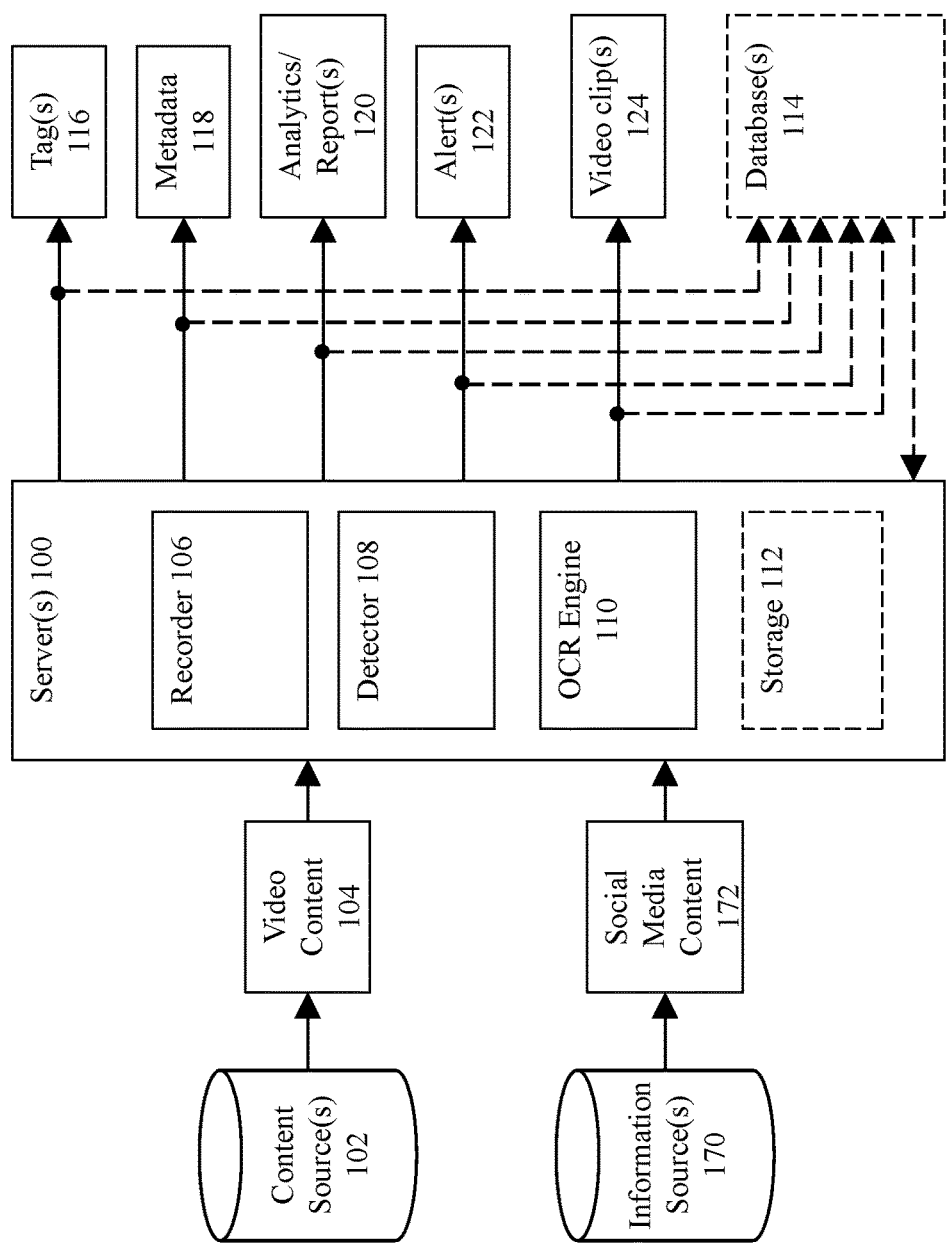
FIG. 1 is a schematic diagram of one embodiment of a system for extracting and tracking social media tags within video content in accordance with the present teachings.

The present teachings are described more fully hereinafter with reference to the accompanying drawings, in which the present embodiments are shown. The following description is presented for illustrative purposes only and the present teachings should not be limited to these embodiments. Any computer/server configuration and architecture satisfying the requirements described herein may be suitable for implementing the system and method of the present embodiments.

Although the invention is described below with reference to television media, it should be understood that the invention equally applies to any type of broadcasting media, such as television, Internet, podcasts, and the like, although not limited thereto.

One benefit of the present teachings is the ability to detect and extract media tags displayed in television or video content and track social media events that are generated after the appearance of the media tags. A system according to the present teachings may use, for example, text localization and/or character recognition to identify media tags within the television or video content. Previous systems and methods are not able to do this.

Another benefit of the present teachings is the ability to effectively distribute computing and bandwidth load associated with receiving large amounts of big data (e.g., video content) transmitted from multiple content sources (e.g., broadcast TV, cable TV, satellite TV, Internet TV, etc.) in different countries, associated with monitoring some or all video content for media tags, and with tracking social media events generated within different information sources (e.g. social media platforms, social networking platforms, social bookmarking platforms, blogs, forums) in response to the media tags. Big data, as a result of its properties in volume, velocity, variability and complexity, create many challenges with respect to scalability, accessibility, and real-time analytics. Further, there are challenges related to handling the massive amounts of incoming video data and OCR scanning the video data for text. The present teachings resolve these issues by providing load balancing and separating data-intensive processes (e.g., data management of video content, data reduction for video content analysis, character recognition of video content), although not limited thereto.

Still another benefit of the present teachings is the ability to monitor multiple social media platforms and track social media events generated after the media tag(s) is displayed within video content, and conducting analytics on the tracked social media events. The system and method according to the present teachings may create real-time statistics and reports correlating the media tags and the social media events. Such information may be important for any entity (e.g., company, brand, product, political figure, celebrity, political party) to determine its reach and strength of impact among the public audience. In addition, the analytics data concerning social media events may help an entity evaluate the sentiment (e.g., positive, negative, neutral, indifference) the general public has for the entity or for a particular topic, subject or news item, relating to the social media tag.

As used herein, the term "unknown text" describes a word(s), phrase(s), and/or character(s) that has been located within video, but has not been recognized (for example, made computer-readable) and analyzed. The term "known text", as used herein, describes a word(s), phrase(s) and/or character(s) that has been recognized and analyzed via scanning, such as optical scanning.

The term "media tag," as used herein, encompasses a keyword, phrase, combination of characters, trademark, logo, identifying mark, name, brand name, product name, social media identifier, uniform resource locator address, or the like that may be used in social media communities to label, classify, bookmark, and/or share information, mark ownership, note boundaries, and/or indicate online identity. As used herein, the term "video content" describes television content, streaming media, podcasts, video blogs, YouTube® videos, or the like. The term "information source," as used herein, refers to social media platforms, social networking platforms, social bookmarking websites, blogs, online forums, and/or the like. The term "social media event" may include, but is not limited to, commentary, tweets, wall postings, and messaging.

Referring to the figures in detail and first to FIG. 1, there is shown an exemplary embodiment of a system for extracting and tracking media tags within video content. The system includes one or more server(s) 100 in communication with one or more content source(s) 102. The system is also in communication with one or more information source(s) 170 to receive social media content, which is discussed in further detail below. The content source(s) 102 may vary with respect to the type of video content provided (e.g., broadcast TV, cable TV, satellite TV, internet TV, etc.) and/or the location/origin of the video content (e.g., Texas, New York, United States, United Kingdom, Russia, etc.). The server(s) 100 is configured to receive video content 104 from the content source(s) 102 over a network via wired and wireless communications. For example, the video content may be transmitted to the server(s) 100 through coaxial cables, fiber optic cables, Ethernet cables, and/or the like. Alternatively or in addition thereto, the server(s) receives the video content from the content source(s) through antennas, satellite dishes, wireless access points, and/or the like.

The system has at least one recorder 106 for saving the video content received from the content source(s) 102. The recorder 106 may also be configured to convert an analog signals received from the content source(s) 102 into digital format, which can be read by processors, computers or other electronic devices. Upon receiving the video content from the content source(s) 102, the recorder 106 can organize, transform, and/or reduce the large amounts of video content for further processing. At least one frame of the video content 104 is transmitted to a detector 108, which detects one or more unknown text that appear within the frame. The detector 108 may utilize text localization and text extraction means to find and extract regions of interest within the frame that have unknown text. For example, a text locator (depicted as 132 in FIG. 3) of the detector 108 may utilize feature detection techniques to perceive text within the frame. The feature detection techniques include, but are not limited to, edge detection, glyph detection, logo detection, and stroke width transform (see Epshtein, Ofek & Wexler, *Detecting Text in Natural Scenes with Stroke Width Transform*, www.math.tau.ac.il/~turkel/imagepapers/text_detection.pdf). The text locator may employ one or more of these feature detection techniques in order to accurately identify the regions of interest having unknown text. Still referring to FIG. 1, once one or more region(s) of interest within the frame have been obtained, the detector 108 with, for example, a text extractor (depicted as 134 in FIG. 3) extracts the regions of interest and creates one or more individual images, each image associated with one of the one or more unknown text.

In addition to locating and extracting regions of interest having unknown text, the detector 108 may further generate, via a metadata formatter (depicted as 138 in FIG. 3), metadata pertaining to each unknown text. Such metadata provides information regarding characteristics of the unknown text relative to the frame and relative to the video content from which the unknown text for obtained. The metadata may include, but is not limited to, time and source information. For example, the metadata may comprise one or more of the following data values: (1) the channel or station (e.g., tv channel or station) that displayed the unknown text; (2) the date and time when the unknown text was displayed; (3) the length of time that the unknown text was displayed; (4) the location within the frame where the unknown text appears; (5) the size of the unknown text relative to the entire frame; (6) the color of the unknown text; and (7) the dimensions of the frame.

The system for extracting and tracking media tags, as shown in FIG. 1, also comprises at least one optical character recognition (OCR) engine 110, which receives the one or more images of the unknown text and corresponding metadata from the detector 108. In some embodiments of the system, the images and metadata are transmitted to the OCR engine 110 as separate data files linked to each other. In other embodiments of the system, the detector 108, via the metadata formatter (depicted as 138 in FIG. 3), combines the images and metadata together under a standard data package format before being transmitted to the OCR engine 110. Examples of a standard data package format are extensible markup language (XML), JavaScript Object Notation (JSON), YAML Ain't Markup Language (YAML), hypertext markup language (HTML), or the like. The metadata formatter may also compress the file size of the images and the metadata. The step of packaging the images and metadata together may provide for efficient, reliable handling and transmission of both types of data.

The OCR engine 110, upon receiving the one or more images associated with the unknown text and the metadata, scans each image with computer vision and performs an OCR process to convert the images into known text (i.e., machine-encoded/computer-readable characters), thereby making it accessible to searching and editing. The conversion of the images into known text provides for the server(s) 100 to determine whether the known text is a media tag 116 and thus whether a media tag was displayed in the video content. The server, for example, may compare the known text with a current list of known media tags created by social media users in order to make this determination. The list of known media tags may be updated periodically, such as hourly, daily, every other hour, weekly, monthly, etc. In another example, the server checks to see if the known text includes (and/or begins with) tagging symbols, such as "#" or "@" symbols, to identify that the known text is a media tag. The server may also search remote databases and/or services, such as the United States Patent and Trademark Office (e.g., trademark database), in order to determine whether the known text is a media tag.

A storage 112 may be incorporated into the server(s) 100 for saving the media tag 116 as well as the analyzed video frame, the image of the unknown text and the metadata 118 associated with the media tag.

Figure 8:
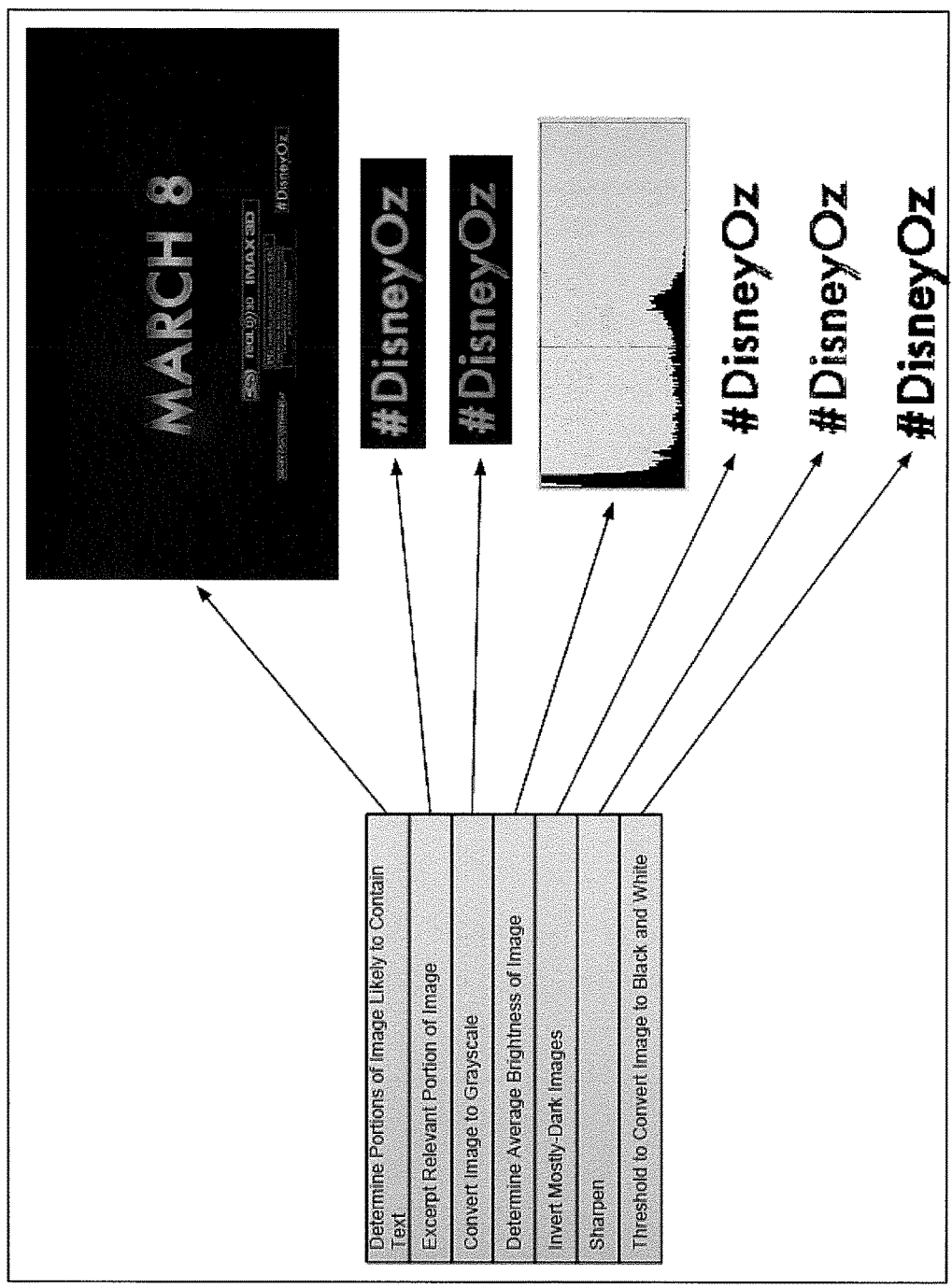
FIG. 8 is a diagram of the image pre-processing performed by the system for extracting and tracking social media tags within video content of FIG. 1.

Still referring to FIG. 1, in order to increase the accuracy of the OCR engine 110, the detector 108 may pre-process the images of unknown text by cleaning them up and enhancing image quality (see FIG. 8). It is well known that a cleaner, sharper image provides for more accurate character recognition. The detector 108 can include an image processing unit (depicted as 136 in FIG. 3) to perform the image enhancements. For example, the image processing unit utilizes various smoothing filters, or the like, to remove or at least reduce noise from the images. The image processing unit initially converts the image from color to grayscale, calculates the average brightness of the image, inverts the dark areas of the image, and sharpens the image. Finally, based on a specified threshold, the image is converted into monochrome black and white. The one or more images associated with the one or more unknown text (depicted as 126 in FIGS. 2 and 3), which are adjusted into a clean, black-and-white format enables the OCR engine 110 to accurately convert the images into known text.

Alternatively, and more preferably in addition to the pre-processing the images via an image processing unit, the server(s) 100 may include an analyzer (depicted as 140 in FIG. 4) to validate the OCR conversion. More specifically, the analyzer uses the metadata to determine whether the OCR engine 110 accurately generated the known text. The analyzer comprises an OCR content characterizer (depicted as 142 in FIG. 4), which identifies the known text as referring to a particular information source (e.g., social media platform, such as Twitter, Facebook, Instagram; social networking platforms, blogs, online forums, etc.). The OCR content characterizer may use various attributes to formulate the characterization of the known text. As an example, transcript content (e.g., "Message us on Facebook") may help in determining that the known text is directed to Facebook. Another example involves the OCR content characterizer accessing the metadata and using information on text color (e.g., "Twitter text is blue") to determine that the known text is directed to the Twitter platform. Still another example involves detecting and identifying an icon in proximity to the known text (e.g., "F" logo or blue bird adjacent to the text) to ascertain which social media platform is involved.

Still referring to FIG. 1, the analyzer (depicted as 140 in FIG. 4) further includes an OCR content validator (depicted as 144 in FIG. 4), which utilizes the information derived by the OCR content characterizer, to perform a validation process of the known text and correct any errors the OCR engine 110 made in its OCR conversion. Alternatively or in addition, the OCR content validator may use certain data values from the metadata 118 to correct OCR errors. These data values may comprise broadcast metadata (e.g., TV program name or TV station name) and broadcast transcript (e.g., what TV personalities are talking about). The OCR content validator can also look at current, on-going social media trends (e.g., popular topics on social media at the time of airing), previous on-screen text displayed during the TV program (e.g., text which appeared 5 minutes earlier), previous on-screen text displayed by the TV station in the same TV program or timeslot (e.g., text which appeared during the last airing of the TV program), and/or previous on-screen text appearing in the same region of the screen/frame (e.g., what previously appeared in the bottom-left region of the screen) in order to correct any errors made by the OCR engine 110 in generating the known text. The results of the validation process and any corrections made to the known text are saved in the storage 112.

Figure 4:
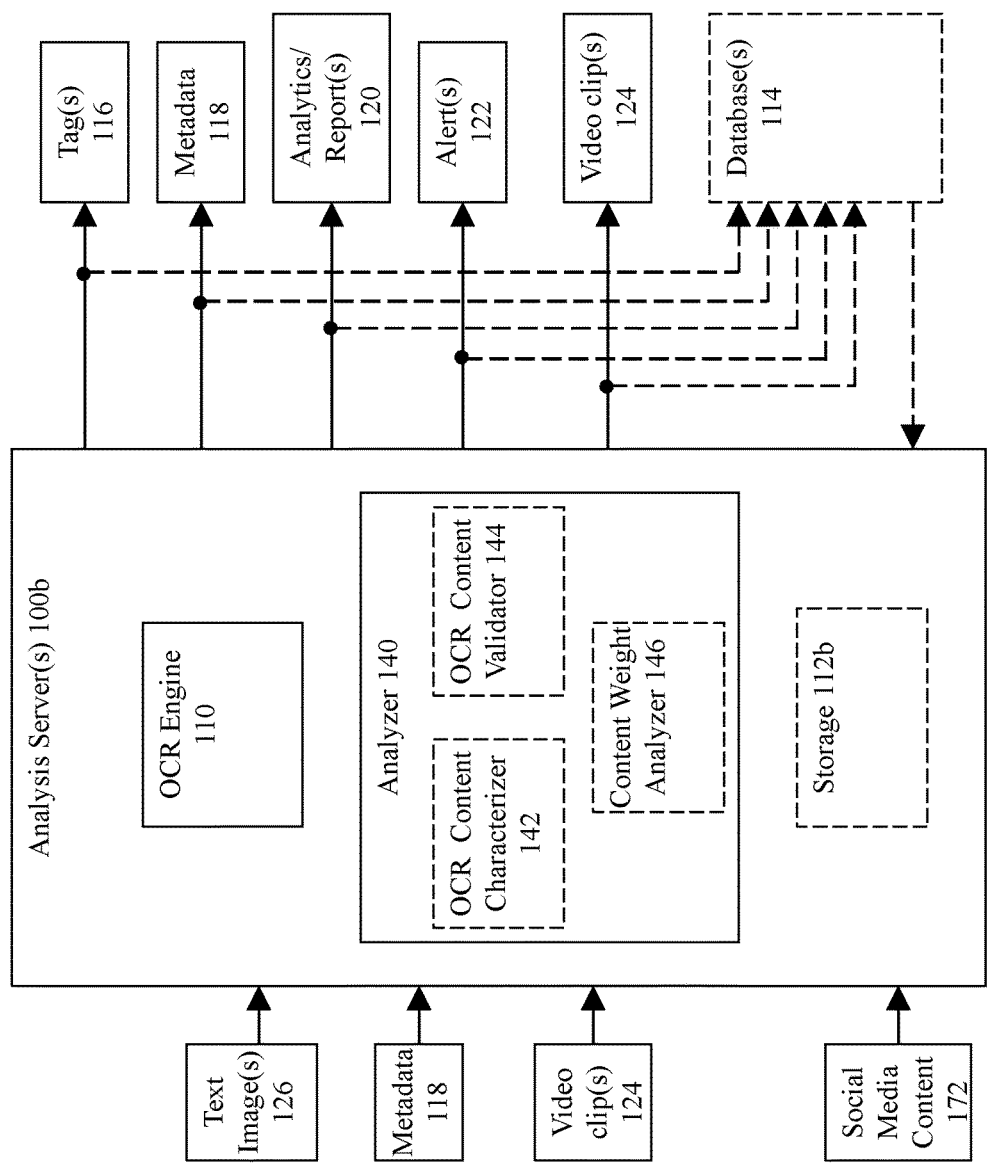
FIG. 4 is schematic diagram of a portion of the system for extracting and tracking social media tags within video content of FIG. 2.

Still referring to FIG. 1, a content weight analyzer (depicted as 146 in FIG. 4) may also be included in the analyzer (depicted as 140 in FIG. 4). The content weight analyzer assigns a weight to the known text, wherein the weight defines a measure of how prominently the known text appeared on-screen in the video content. Various aspects may be used to determine this weight, including, but not limited to, on-screen relative size (e.g., percentage of the screen/frame that the known text occupies), on-screen duration (e.g., how long the known text appears on screen), and on-screen contrast (e.g., was the known text displayed with high contrast or watermarked in the video frame). The weight measurement is then stored in the storage 112 for later use by the server(s) 100 in conducting social media analytics.

After the one or more known text has been characterized, validated for accuracy, and assigned a weight measurement, the server(s) 100 identify the one or more known text as a media tag 116. The media tag 116 and the metadata 118, image of the unknown text, and weight measurement associated with the media tag may be saved in the storage 112 and output for display on a monitor(s) connected to the server or computer(s) (shown as 160 in FIG. 7) connected to the server(s) 100 over a network, such as the Internet (shown as 150 in FIG. 7).

In some embodiments of the present teachings, the server(s) 100 also extracts video clip(s) 124 from the recorder 106 which comprise the frame of video content analyzed by the server and a plurality of frames before and after the analyzed frame. As an example, the video clip may show video content five seconds before and five seconds after the analyzed frame. The video clip(s) 124 may be saved in the storage 112 and output for display on the monitor(s) connected to the server and/or computer(s) connected to the server over the network.

The server(s) 100 may further be configured to monitor one or more information source(s) 170 (e.g., social media platforms, social networking platforms, social bookmarking platforms, blogs, online forums, etc.) and detect any social media events 172 generated by social media users in response to the media tag being displayed. As shown in FIG. 1, the server(s) 100 is in communication with one or more information source(s) 170 to receive social media content 172 (e.g., commentary, tweets, wall postings, messaging, etc.). The server(s) 100 may include analytics tools, embodied as hardware or software executing in the server, which evaluates the social media events with respect to the characteristics of the media tags, (i.e., metadata 118, OCR content characterizations, content weight measurement). The server(s) 100 can develop statistics pertaining to the social media events, create correlations between a broadcast event with corresponding social media events or social media trends, determine the level of audience engagement, determine the socio-economic makeup of a cohort of social media users, and provide other data analytics. This analytics data 120 may be transmitted as output by the server(s) 100 and/or saved in the storage 112 for later access. Specifically, the server(s) may present the analytics data 120 in reports or in a dashboard or ticker display, wherein relevant social media activity is shown alongside information concerning the media tag (e.g., metadata) as well as a clip of the video content showing the media tag. The analytics data may also comprise sentiment data (e.g., positive, negative, neutral, indifference), which includes information regarding the general public's feelings for the entity or a particular topic, subject or news item, relating to the social media tag. One example in which the server(s) assesses the tone of social media events is to evaluate the quantity of positive or negative markings/indicators, such as "likes" and "dislikes".

As shown in FIG. 1, the server(s) 100 is also configured to generate and/or output alerts 122, for example to computer(s) (depicted as 160 in FIG. 7), to notify a subscriber when a certain media tag of interest appears in the video content and/or when the first social media event is generated concerning a particular media tag. Such alerts may be useful for subscribers to keep track of their own publicity and/or the publicity of competitors, competing brands, or competing products/services, although not limited thereto. The alerts 122 may also be useful for social media users to increase broadcast content engagement (e.g., notifying @Interested Party that they have been mentioned in an airing of their local news show).

In some embodiments of the present teachings, the media tag(s) 116, the analyzed video frame(s), the image(s) associated with the one or more unknown text, the weight measurements associated with the media tag(s), metadata 118 associated with the media tag(s), the analytics data 120, and video clips 124 may be stored in one or more databases 114 that are separate and external to the server(s) 100. The database 114 is connected with the server(s) 100 over a network via wired and/or wireless communications links. It is also noted that computer(s) 160 (shown in FIG. 7) may not receive the server outputs 116, 118, 120, 124 directly from the server(s) 100, but may receive them from the database(s) 114. In some embodiments, the database(s) 114 may locate and retrieve the video clip(s) 124 directly from the recorder 106 using the metadata 118 (e.g., date and time that the media tag was displayed).

Although not shown in FIG. 1, the server(s) 100 may further include a content decoder/extractor (depicted as 130 in FIG. 3) in communication with the recorder 106. If the content source(s) 102 transmit video signals to the server(s) 100 in encoded and/or encrypted form, the content decoder/extractor decodes and decrypts the signals in order to obtain the video content 104. Further, this component extracts one or more frames from the video content 104 for analysis by the detector 108. The content decoder/extractor may select the frame(s) to be analyzed using keyframes, visually distinct frames, and/or a time interval. For example, the content decoder/extractor may select a frame from the video content every 30 seconds, 1 minute, 5 minutes, or 10 minutes. Alternatively, the content decoder/extractor may be configured to recognize when consecutive frames of video content are visually distinct. If the visual changes between consecutive frames is greater than a specified threshold (e.g., picture of the first frame differs from the picture of the subsequent frame by more than 90%), the content decoder/extractor may automatically selects a frame. After selection is made, the content decoder/extractor may place the frame(s) in an input processing buffer before being sent to the detector 108.

Figure 2:
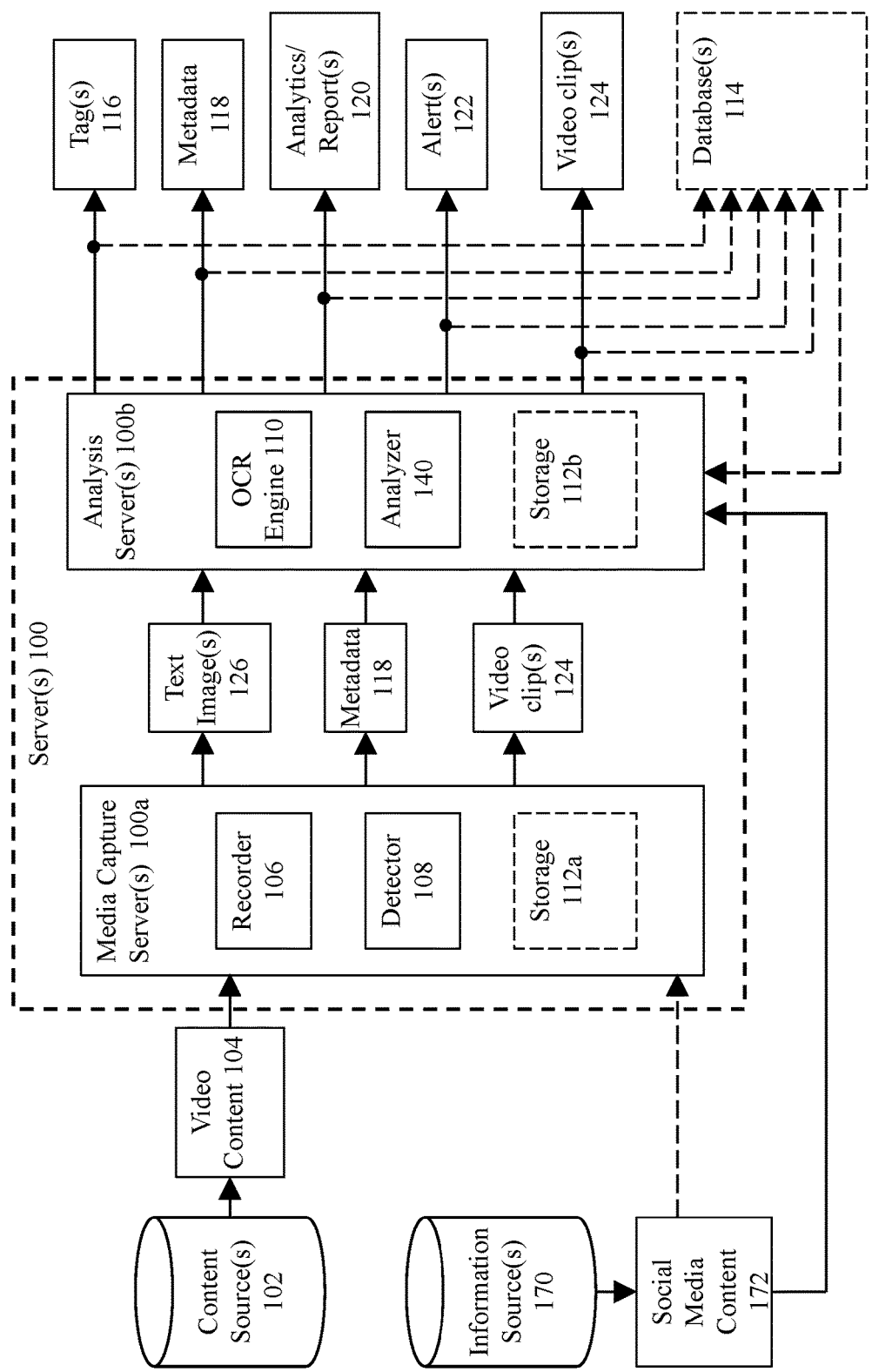
FIG. 2 is a schematic diagram of one embodiment of the system for extracting and tracking social media tags within video content of FIG. 1, wherein the system comprises at least two servers.

Referring now to FIG. 2, shown is another embodiment of the system for extracting and tracking media tags within video content. In order to address problems with excessive computing load in handling massive amounts of video content and performing OCR conversion, the system comprises two or more servers. For example, at least one media capture server 100a and at least one analysis server 100b form the framework of the system. There is a communications link between the media capture server 100a and the analysis server 100b to provide continuous communication between the components. The communications link may comprise wired and/or wireless connections.

As shown in FIG. 2, the media capture server(s) 100a receives video content 104 from one or more content sources 102. The media capture server(s) 100a includes a recorder 106 for saving the video content to memory and a detector 108. The detector 108 has the same functions as previously described with respect to the embodiment of FIG. 1. The detector 108 receives at least one frame of the video content 104 from the recorder 106, detects one or more unknown text within the frame, and creates one or more images 126, each of the one or more images associated with one of the one or more unknown text. Further, the detector 108 generates metadata 118 associated with the one or more unknown text appearing in the frame. The analysis server(s) 100b comprises an OCR engine 110 and an analyzer 140. Both the OCR engine 110 and the analyzer 140 have the same functions as previously described with respect to the embodiment of FIG. 1. The OCR engine 110 scans the one or more images 126 and converts the one or more images 126 into one or more known text. Each of the one or more known text is associated with one of the one or more unknown text. The one or more known text is transmitted to the analyzer 140, wherein the accuracy of the known text is validated.

Both the media capture server(s) 100a and the analysis server(s) 100b may include internal storage 112a, 112b. The storage 112a is adapted to save data received and generated by the media capture server(s) 100a, for example, images 126 of unknown text, metadata 118, and video clips 124 comprising video content frames before and after the frame is analyzed by the detector 108. Similarly, the storage 112b of the analysis server(s) 110b is adapted to save data received and prepared by the analysis server(s) 100b. For instance, the storage 112b saves the various outputs the analysis server(s) 100b generates, including the media tags 116, metadata 118, analytics data 120, alerts 122, and video clips 124, as well as the images 126 of unknown text created by the media capture server(s) 100a.

The system shown in FIG. 2 may also include one or more database(s) 114 connected to the media capture server(s) 100a and/or the analysis server(s) 100b. The database(s) 114 may save the outputs of the media capture server(s) and/or the analysis server(s). For example, the database(s) 114 connected to the media server(s) 100a records the images 126 of unknown text, metadata 118, and/or video clips 124 prepared by the detector 108. The database(s) 114 connected to the analysis server(s) 100b records the outputs of the analysis server(s), which comprise media tags 116, metadata 118, analytics data 120 (e.g., reports, dashboard/ticker display), alerts 122, and video clips 124. Details about the outputs of the media capture server and the analysis server are described further below.

As shown in FIG. 2, the media capture server(s) 100*a* and/or the analysis server(s) 100*b* are in communication with one or more information source(s) 170 to receive social media content 172 that are generated within the information source(s). For example, with the analysis server(s) 100*b* communicatively connected with the information source(s) 170, the server(s) 100*b* can monitor and track relevant social media events (e.g., events generated after a media tag appears in video content) and conduct analytics measurements on the social media events.

Figure 3:
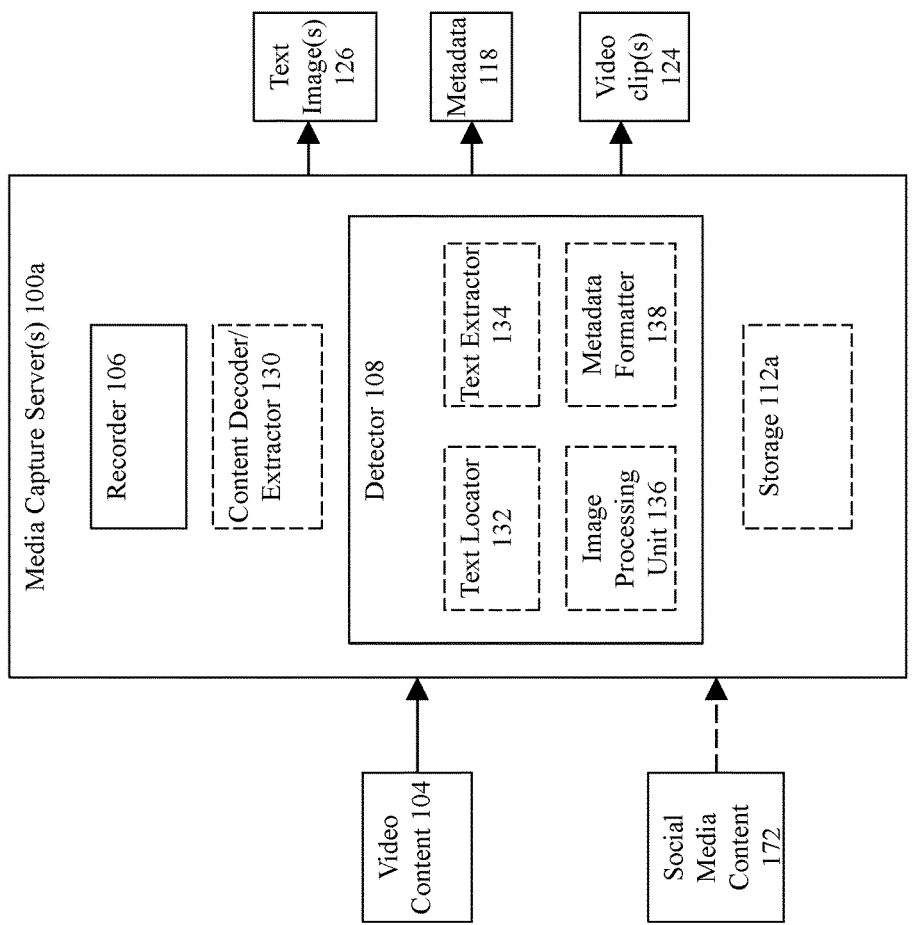
FIG. 3 is schematic diagram of a portion of the system for extracting and tracking social media tags within video content of FIG. 2.

Referring to FIG. 3, there is shown a detailed view of the media capture server 100*a* of the system of FIG. 2. The detector 108 may include a text locator 132, a text extractor 134, an image processing unit 136, and/or metadata formatter 138, each having the same functions as previously described. For example, the text locator 132 uses one or more feature detection techniques, such as edge detection, glyph detection, logo detection, and/or stroke width transform, to locate regions within the frame that have unknown text. The text extractor 134 extracts the areas of interest identified by the text locator 132 and generates individual images 126 of each unknown text. To improve the accuracy of OCR conversion, the media capture server(s) 100*a* may pre-process the images 126 associated with the unknown text, via a image processing unit 136, in order to sharpen the images, reduce noise therein, and convert the images into monochrome. The detector 108 may also comprise a metadata formatter 138 for generating metadata 118 concerning the unknown text and images of the unknown text.

The media capture server 100*a* may comprise a content decoder/extractor 130. If the content source(s) 102, as shown in FIG. 2, transmits encoded and/or encrypted video signals to the media capture server(s) 100*a*, the content decoder/extractor 130 decodes and decrypts the signals to obtain the video content 104. The decoder/extractor 130 further selects and extracts at least one frame from the video content using keyframes, visually distinct frames and/or a time interval. The selected frame(s) are then placed in an input processing buffer by the decoder/extractor 130 before being transmitted to the detector 108.

Referring to FIG. 4, there is shown a detailed view of the analysis server 100*b* of the system shown in FIG. 2. The analyzer 140 of the analysis server 100*b* may include an OCR content characterizer 142, an OCR content validator 144, and a content weight analyzer 146, each having the same functions as previously described with respect to the embodiment of FIG. 1. The OCR content characterizer 142 evaluates the known text generated by the OCR engine 110 and identifies the particular social media service or platform with which the known text is associated. The OCR content characterizer may use one or more attributes (e.g., transcript content, text color, identifying marks or icons in proximity to known text) to characterize the known text.

The OCR content validator 144 validates the accuracy of the OCR conversion and corrects any errors the OCR engine 110 made during the conversion process. The OCR content validator 144 may utilize the information derived by the OCR content characterizer 142 and/or metadata 118 to validate and verify that the known text accurately reflects the characters shown in the image of unknown text.

The content weight analyzer 146 appoints a weight measurement to the known text, which indicates how prominently the known text appeared in the frame of video content. The weight measurement may be calculated based on the on-screen relative size, on-screen duration, and/or the on-screen contrast level of the known text relative to the rest of the frame. The weight measurement may be stored in the storage 112*b* for later use by the analysis server(s) 100*b* in conducting social media analytics.

Figure 5:
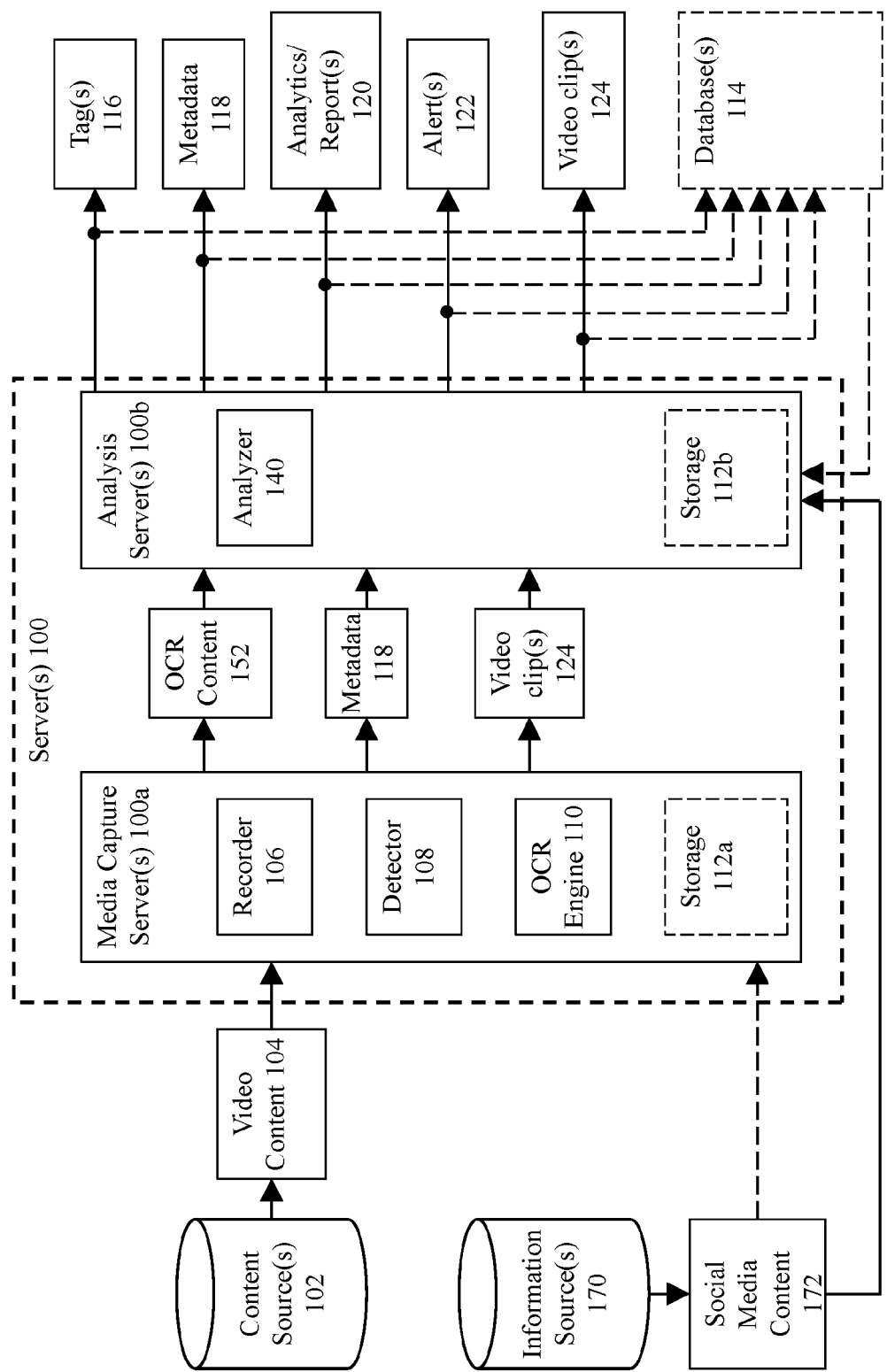
FIG. 5 is a schematic diagram of another embodiment of the system for extracting and tracking social media tags within video content of FIG. 2, wherein processing components are assigned differently among the at least two servers.
Figure 6:
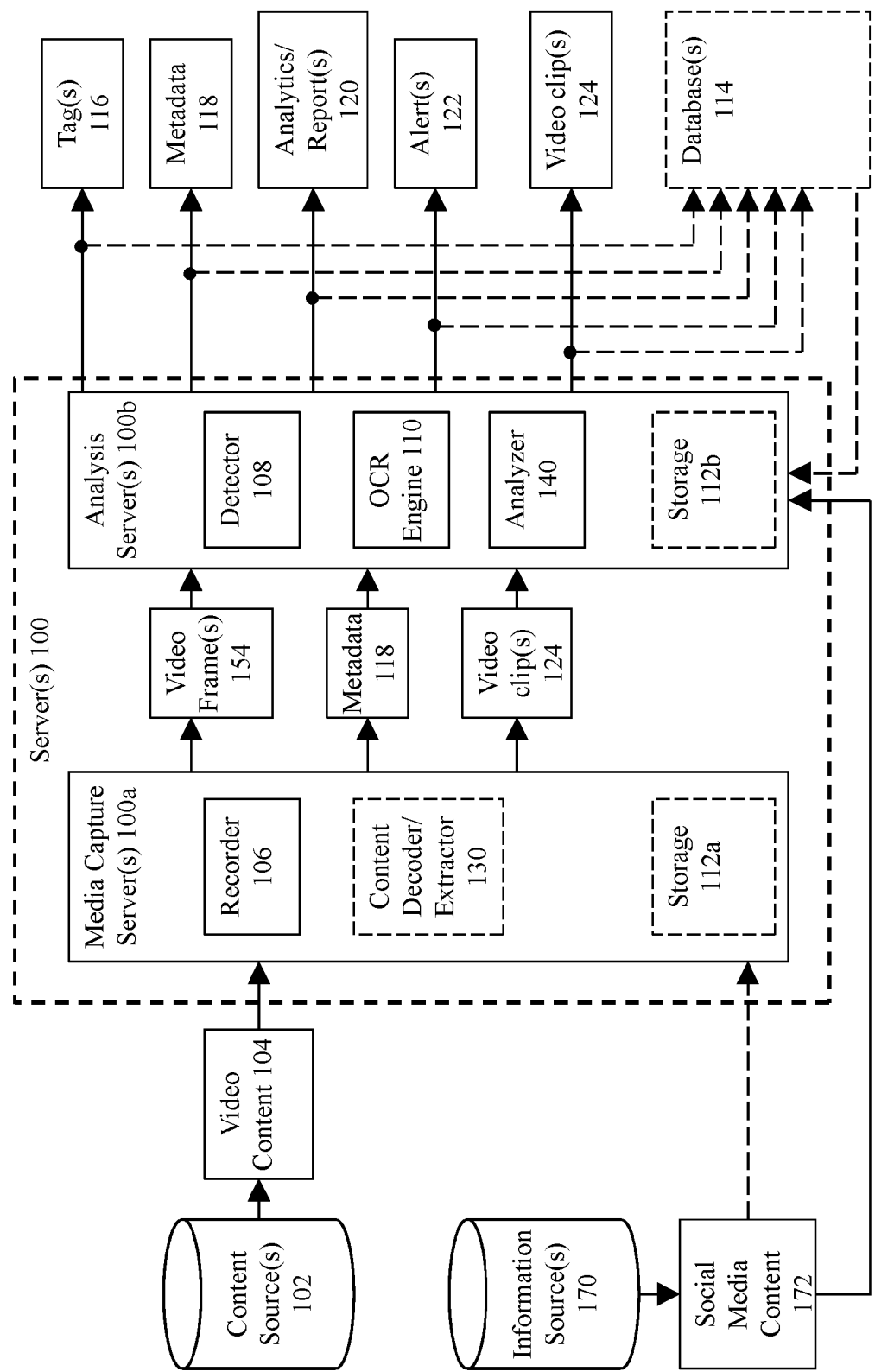
FIG. 6 is a schematic diagram of another embodiment of the system for extracting and tracking social media tags within video content of FIG. 2, wherein processing components are assigned differently among the at least two servers.

Referring to FIGS. 5 and 6, there are shown different arrangements of the media capture server(s) 100*a* and the analysis server(s) 100*b*. FIG. 5 shows the at least one media capture server(s) 110*a* having the recorder 106, detector 108, and OCR engine 110 while the at least one analysis server(s) 100*b* has the analyzer 140. Unlike in FIG. 2 where image(s) 126 of unknown text generated by the detector 108 are sent from the media capture server(s) to the analysis server(s), FIG. 5 shows the media capture server(s) 100*a* transmitting OCR content 152, such as the known text generated by the OCR engine 110, to the analysis server(s) 100*b*. FIG. 6, in contrast, shows the at least one media capture server 100*a* having the recorder 106 while the analysis server(s) 100*b* has the detector 108, the OCR engine 110 and the analyzer 140. The media capture server(s) 100*a* may further include a content decoder/extractor 130 for selecting and extracting one or more frames from the video content 104. In this case, the media capture server(s) 100*a* transmits the video frame(s) 154 to the analysis server(s) 100*b* for further processing by the detector 108.

Figure 7:
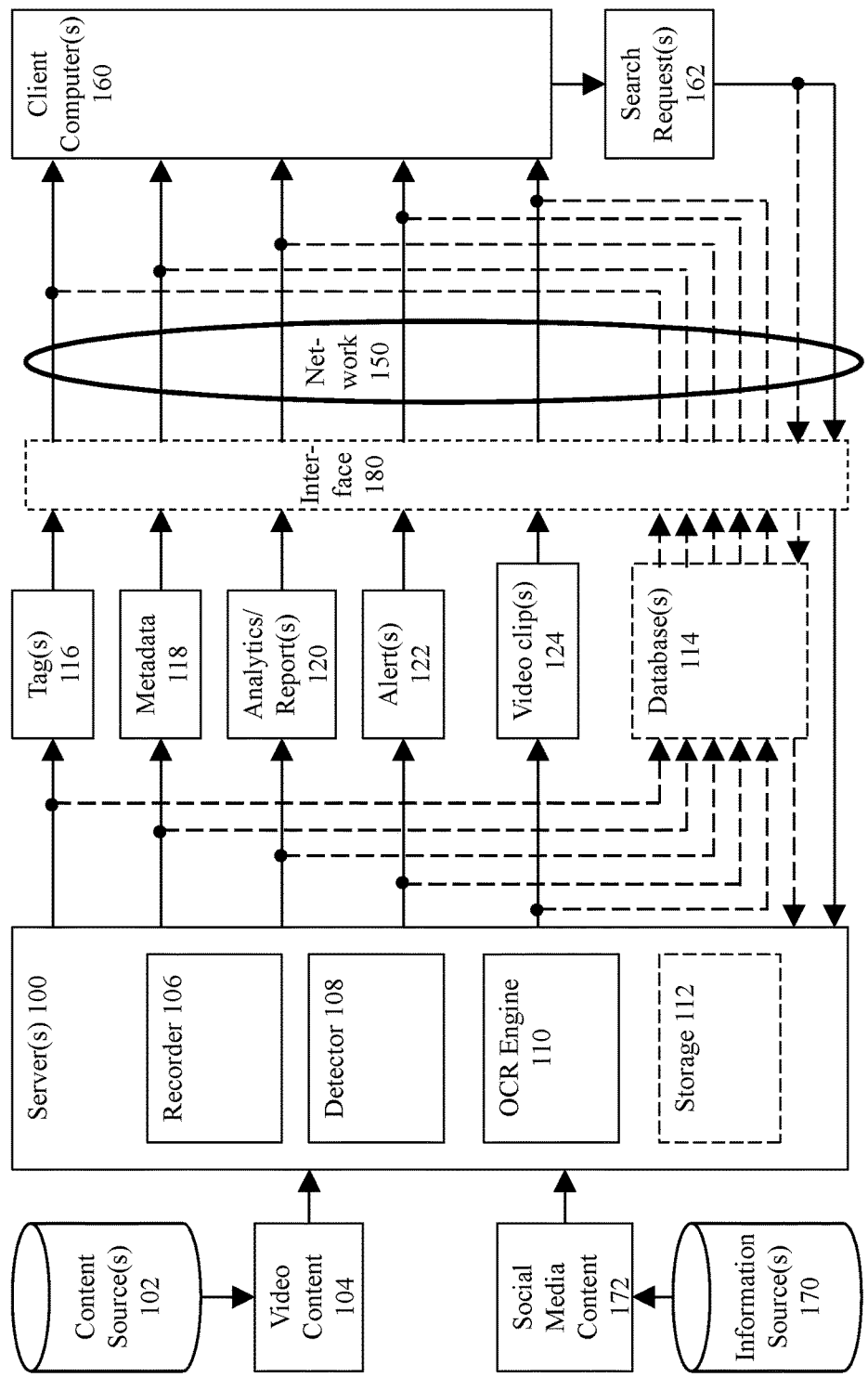
FIG. 7 is a schematic diagram of the system for extracting and tracking social media tags within video content of FIG. 1, wherein the system is in communication with one or more computational devices.

FIG. 7 shows another embodiment of the system for extracting and tracking social media tags within video content. The system of FIG. 7 comprises the same arrangement as the system shown in FIG. 1, with the addition of communications links providing communication over a network 150 (e.g., Internet) between the server(s) 100 and one or more client/subscriber computer(s) 160. The communications links may comprise wired and/or wireless connections. The client computer(s) 160 may include any form of a computational device (e.g., laptop, desktop, smartphone, tablet, etc.), and may include both web-enabled and non-web-enabled devices, although not limited thereto.

As shown in FIG. 7, one or more client computer(s) 160 may interact with the server(s) 100 in order to conduct searching and/or monitoring over the network 150. In some embodiments, the interaction between the client computer(s) 160 and server(s) 100 may utilize an interface and/or interface system 180 (e.g., webpage interface), although not limited thereto. Through the interface, the user may request a search (search request 162) for a particular media tag or for media tag(s) relating to a certain keyword or topic. The search request may comprise a request to monitor, continuously or for a specified period of time, the video content for a particular media tag or for media tag(s). As used herein, the term search request encompasses monitoring requests. For example, a subscriber can provide search criteria in the form of a particular media tag (e.g., #InterestedTag) or keyword terms (e.g., trademark, company name, brand name, product name, person's name, political campaign, etc., although not limited thereto). Accordingly, the interface 180 receives a search request 162 to search and/or monitor for a media tag in the video content. The search request 162 having the search criteria is transmitted to the server(s) 100, wherein the server(s) begins to look for media tags matching the subscriber-specified media tag(s) or keyword(s). The server(s) 100 then transmits search results—e.g., media tag 116, metadata 118 associated with the media tag, analytics 120 concerning social media events generated as a result of the media tag appearing in video content, and video clips 124 of the media tag—to the client computer(s) 160 in real-time or periodically. For instance, the interface of the client computer(s) may present the analytics data 120 in the form of reports that identify the media tags and provide an analysis of corresponding social media events and social media trends. The interface may also present the analytics data 120 in the form of a dashboard or ticker display, which shows a video clip 124 of the media tag and all social media events being generated in real-time.

The client computer(s) 160 may receive alerts 122 from the server(s) 100, notifying subscribers and/or social media users when a particular media tag appears within the video content 104. For example, the alert 122 may force a pop-up window to appear in the interface of the client computer(s) 160. In another example, the alert 122 comprises an email and/or a text message containing notification regarding the detected media tag.

Subscribers may also specify limitations in their search/monitoring criteria to restrict searching/monitoring to certain TV channels or stations, certain geographic locations (e.g., city, county, state, country, region, etc.), certain languages (e.g., English, Spanish, French, etc.), and/or period of time. As an example, the subscriber may request a search for "#Disney" only on NBC, ABC, and CBS channels for the next 24 hours. Subscribers can also make search requests pertaining to past video content. For example, a subscriber may request search results for "#Disney" only on NBC, ABC, and CBS channels for the past 24 hours. In this instance, the search request 162 may be directed to the server(s) 100, which retrieves relevant data from the storage 112 and provides the search results to the client computer(s) 160. The search request 162 may, conversely or in addition, be directed to the database(s) 114, which retrieves relevant data previously stored in its memory and transmits the search results to the client computer(s) 160. It is further noted that the search request 162 can be transmitted to the database(s) 114, which can subsequently forward the request to server(s) 100 for performing the search. Although the embodiment shown in FIG. 7 depicts a specific arrangement of communication links between server(s) 100 and client computer(s) 160, the present teachings are not limited thereto.

Figure 9:
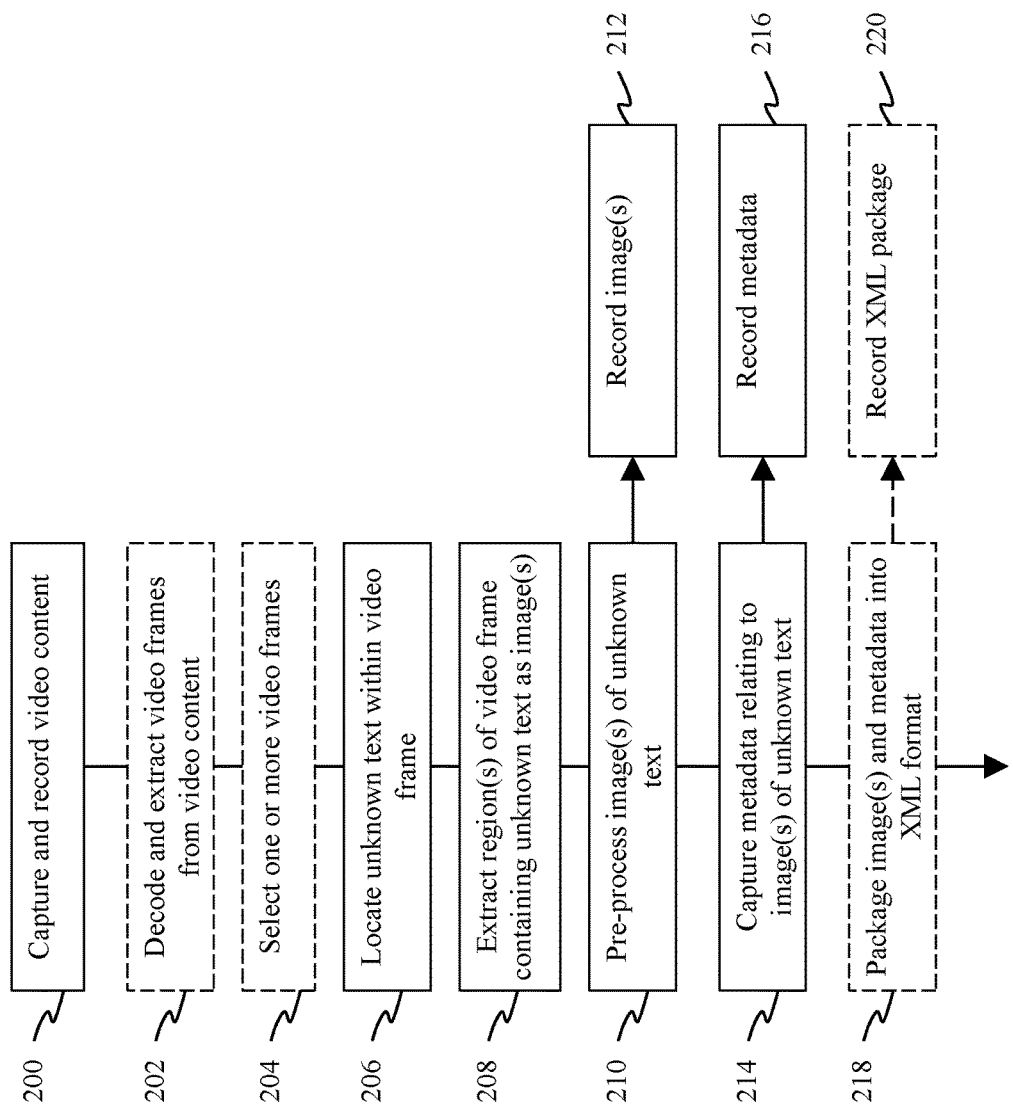
FIG. 9 is a flowchart of a method according to the present teachings for using the system of FIGS. 2-4.
Figure 10:
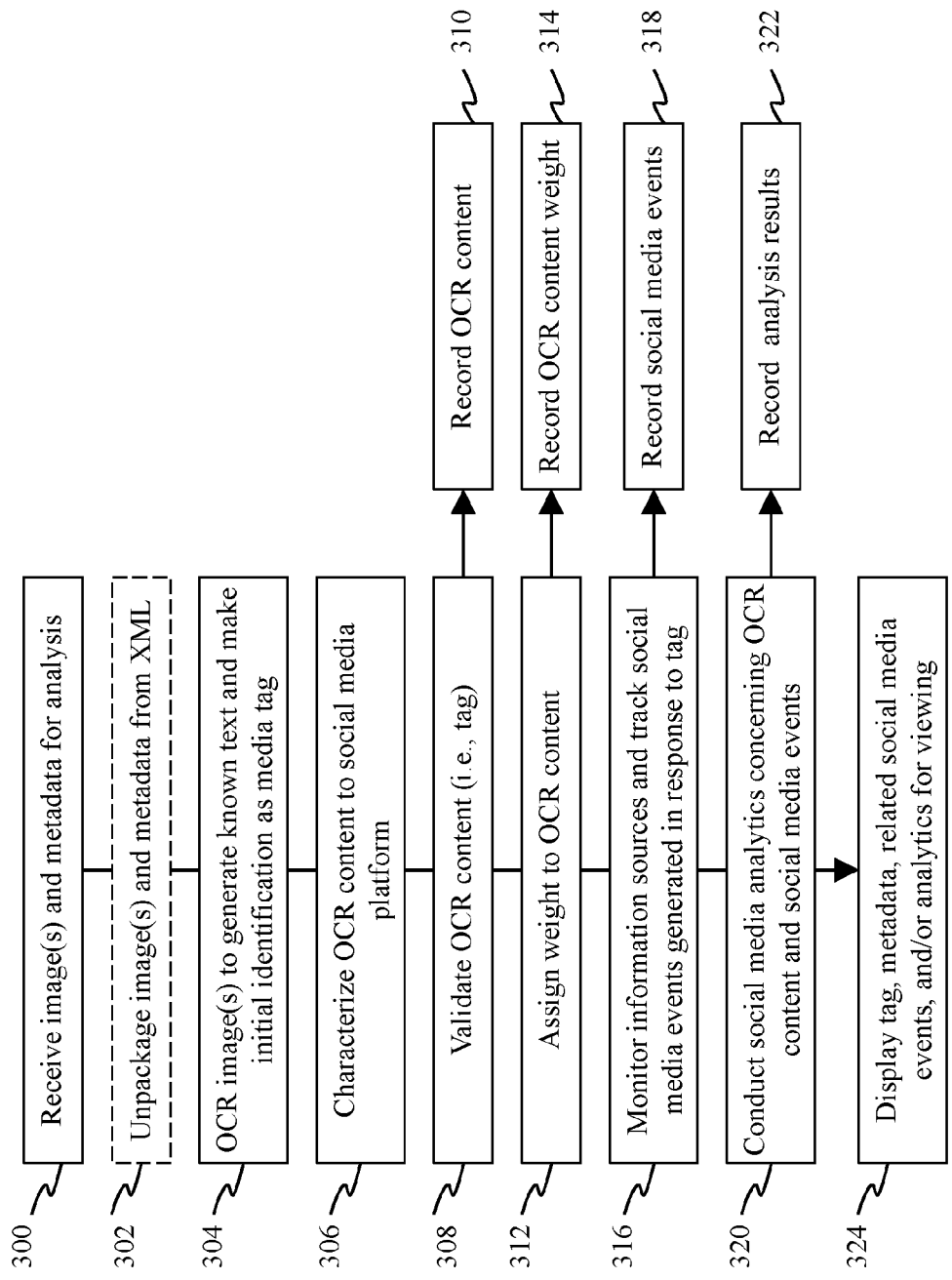
FIG. 10 is a flowchart of a continuation of the method of FIG. 9.

Referring to FIGS. 9-10, there is shown a flowchart of one embodiment of a method according to the present teachings. In FIG. 9, the method comprises the following steps of: capturing and recording video content from one or more content source(s) (step 200); and locating unknown text within one or more frames of the video content (step 206). Prior to step 206, the method may further comprise decoding encrypted video signals from the content source(s) in order to obtain the video content and extracting frames from the video content (step 202); and selecting one or more of the frames for further processing by the server(s) (step 204). After unknown text is detected and located within the frame, the regions of the frame having the unknown text are extracted and saved as images (step 208). The method further comprises the steps of: pre-processing the images of unknown text to enhance the quality of the images (step 210); capturing metadata relating to the unknown text and/or images of the unknown text (step 214); and saving the images of unknown text and corresponding metadata in memory storage (steps 212 and 216). In some embodiments, the method may include the additional steps 218 and 220, wherein the images and corresponding metadata are packaged in standard data package formats (e.g., XML) and recorded in memory storage.

Continuing in FIG. 10, the method comprises the steps of transmitting/receiving the images of unknown text and corresponding metadata from one server (e.g., media capture server 100a) to another server (e.g., analysis server 100b) for OCR conversion (step 300). If the images and metadata were previously packaged together (step 218), the additional step of unpacking the images and metadata (step 302) may be required before OCR analysis may be conducted. The method then includes scanning the images of unknown text via OCR, converting the images into known text, and identifying initially the known text as a media tag (step 304); characterizing the known text as referring to a particular social media service or platform (step 306); validating the accuracy of OCR conversion in generating the known text and in turn validating the known text is a media tag (step 308); and assigning to the known text a measurement defining the weight in which the known text appears in the analyzed frame (step 312). After each of steps 308 and 312, the known text may be recorded in memory (step 310) and the calculated weight measurement of the known text may be recorded in memory storage (step 314). The method steps shown in FIG. 9 are exemplary in nature and may be in any order.

With the media tag detected in the video content, the method continues with the following steps: monitoring social media platforms and tracking social media events generated in response to the media tag appearing in video content (step 316); saving the social media events into memory storage (step 318); generating analytics pertaining to the social media events (step 320); recording the analytics in memory storage (step 322); and displaying the media tag, corresponding metadata, tracked social media events, and/or analytics for viewing on a computer device (step 324). The method steps shown in FIG. 10 are exemplary in nature and may be in any order.

Those skilled in the art will recognize, upon consideration of the above teachings, that the above exemplary embodiments are based upon the use of one or more hardware components and/or software components executing on computer readable medium(s). Further, general purpose computers, microprocessor based computers, desktops, laptops, tablets, application specific circuits and/or hard wired logic may be used to construct alternative equivalent embodiments.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attach drawings.

What is claimed is:

1. A system for extracting and tracking media tags within video content, comprising:
    at least one server in communication with a plurality of content sources, the server receiving video content from the content sources;
    a recorder saving the video content;
    a detector receiving at least one frame of the video content, the detector detecting one or more unknown text within the frame and creating one or more images, each image associated with one of the one or more unknown text, the detector generating metadata associated with the one or more unknown text appearing in the frame; and an optical character recognition engine scanning the one or more images and converting the one or more images into one or more known text, each of the one or more known text associated with one of the one or more unknown text;

wherein the server determines whether the one or more known text is a media tag.

2. The system of claim 1, wherein the media tag is a trademark, logo, social media identifier, or uniform resource locator address.

3. The system of claim 1, wherein the detector comprises a metadata formatter for generating the metadata associated with the one or more unknown text, wherein the metadata comprises time and source information.

4. The system of claim 3, wherein the metadata comprises at least one data value from the following:
a channel or station that displayed the unknown text;
a date and time when the unknown text was displayed;
a length of time that the unknown text was displayed;
a location of the unknown text within the frame;
a size of the unknown text within the frame;
a color of the unknown text; and
dimensions of the frame.

5. The system of claim 1, wherein the server monitors social media services over a network, identifies social media events generated after the media tag is displayed in the video content, and provides analytics measurements of the social media events.

6. The system of claim 5, wherein the server receives a request from the client computer over a network to search for a term appearing in the video content, the server providing search results which comprise a media tag indicative of the term, metadata corresponding to the media tag indicative of the term, and analytics measurements of media events associated with the media tag indicative of the term.

7. The system of claim 5, wherein the server assesses a sentiment of the social media events.

8. The system of claim 1, further comprising a database for storing the media tag, the metadata associated with the media tag, the frame having the media tag, and a video clip comprising a plurality of frames before and after the frame having the media tag.

9. The system of claim 1, wherein the detector comprises:
a text locator which identifies one or more regions of the frame where the one or more unknown text is displayed, the text locator utilizing at least one of stroke width transform, edge detection, glyph detection, or logo detection to detect the one or more unknown text and to identify the one or more regions, and
a text extractor which extracts the one or more regions from the frame for creating the one or more images.

10. The system of claim 1, further comprising an image processing unit which reduces noise in the one or more images by performing at least one of converting the one or more images to grayscale, determining the average brightness of the one or more images, inverting dark areas of the one or more images, and sharpening the one or more images, and further converts the one or more images to monochrome.

11. The system of claim 1, further comprising an analyzer in communication with the optical character recognition engine, wherein the analyzer performs at least one of the following: determines the media tag from the one or more known text, identifies that the one or more known text refers to one or more social media services, and validates whether the optical character recognition engine accurately generated the one or more known text from the one or more images using at least the metadata.

12. The system of claim 11, wherein the accuracy of the optical character recognition engine in generating the one or more known text is validated by comparing known text that appeared in previous frames of the video content.

13. The system of claim 1, wherein the recorder, detector, and optical character recognition engine comprise different software components executing on computer readable medium.

14. A system for extracting and tracking media tags within video content, comprising:
a media capture server and an analysis server, the media capture server and the analysis server being in communication with each other;
the media capture server in communication with a plurality of content sources, the media capture server receiving video content from the content sources and having a recorder which saves the video content;
a detector receiving at least one frame of the video content, the detector detecting one or more unknown text within the frame and creating one or more images, each of the one or more images associated with one of the one or more unknown text, the detector generating metadata associated with the one or more unknown text appearing in the frame;
an optical character recognition engine scanning the one or more images and converting the one or more images into one or more known text, each of the one or more known text associated with one of the one or more unknown text;
the analysis server having an analyzer which receives the one or more known text from the optical character recognition engine, the analyzer determining whether the one or more known text is a media tag; and
an interface in communication with the media capture server and the analysis server, the interface receiving a request to monitor for the media tag in the video content from a user computer;
wherein the analysis server generates alerts notifying when the media tag is detected in the video content.

15. The system of claim 14, further comprising a database in communication with the analysis server, the database storing the media tag, the metadata associated with the media tag, the frame having the media tag, and a video clip comprising a plurality of frames before and after the frame having the media tag.

16. The system of claim 14, wherein the media capture server comprises two or more media capture servers in communication with the analysis server, the media capture servers transmitting processed video content to the analysis server for centralized analysis of the media tag and social media events generated after the media tag is displayed in the video content, the media capture servers each receiving video content from different content sources.

17. The system of claim 14, wherein the detector comprises a text locator which identifies one or more regions of the frame where the one or more unknown text is displayed, and a text extractor which extracts the one or more regions from the frame for creating the one or more images.

18. The system of claim 14, wherein the at least one media capture server further comprises a content decoder in communication with the recorder, the content decoder decodes video signals from the content sources to obtain the video content and extracts the at least one frame for output to the detector.

19. The system of claim 14, wherein the analyzer validates whether the optical character recognition engine accurately generated the one or more known text from the one or more images using at least the metadata.

20. The system of claim 14, further comprising a metadata formatter, the metadata formatter packaging the one or more images and the metadata associated with the one or more unknown text into a data package file for transmission between the media capture server and the analysis server.

21. The method for extracting and tracking media tags within video content, comprising the steps of:
   receiving video content with a server from one or more content sources;
   saving the video content in a storage;
   extracting on the server at least one frame of the video content;
   detecting on the server one or more unknown text within the frame and creating one or more images, each of the one or more images associated with one of the one or more unknown text;
   retrieving metadata associated with the one or more unknown text appearing in the frame;
   scanning the one or more images using optical character recognition and converting the one or more images into one or more known text, each of the one or more known text associated with one of the one or more unknown text; and
   determining whether the one or more known text is a media tag.

22. The method of claim 21, wherein the step of detecting comprises the steps of:
   identifying one or more regions of the frame where the one or more unknown text is displayed; and
   extracting the one or more regions from the frame for creating the one or more images.

23. The method of claim 21, further comprising the steps of:
   processing the one or more images by reducing noise in the one or more images;
   converting the one or more images to monochrome before scanning the one or more images with optical character recognition; and
   packaging the one or more processed images and the metadata associated with the one or more unknown text into a data package file for transmission to an optical character recognition engine.

24. The method of claim 21, wherein the step of determining whether the one or more known text is a media tag comprises:
   identifying that the one or more known text refers to one or more social media services; and
   validating whether the scanning accurately generated the one or more known text from the one or more images using at least the metadata.

25. The method of claim 21, further comprising the steps of:
   monitoring social media services over a network;
   identifying social media events generated with the social media services after the media tag is displayed in the video content;
   generating measurements and analytics of the social media events; and
   displaying the media tag, the metadata, and the measurements and analytics for viewing on a user computer.

26. The method of claim 21, providing an alert when a particular media tag being monitored is detected.

* * * * *